United States Patent
Fukaya et al.

(10) Patent No.: US 7,822,540 B2
(45) Date of Patent: Oct. 26, 2010

(54) SYSTEMS, METHODS, AND PROGRAMS FOR DETERMINING A TRAVEL-RELATED TIME

(75) Inventors: Takaharu Fukaya, Kariya (JP); Tang Xu, Brussels (BE)

(73) Assignee: Aisin AW Co., Ltd., Anjo (JP)

( * ) Notice: Subject to any disclaimer, the term of this patent is extended or adjusted under 35 U.S.C. 154(b) by 1107 days.

(21) Appl. No.: 11/503,918

(22) Filed: Aug. 15, 2006

(65) Prior Publication Data

US 2007/0043501 A1    Feb. 22, 2007

(30) Foreign Application Priority Data

Aug. 19, 2005   (EP) .................................. 05018099

(51) Int. Cl.
*G01C 21/00*    (2006.01)
(52) U.S. Cl. ........................ 701/204; 701/201
(58) Field of Classification Search ......... 701/200–202, 701/117–119, 204, 207–209
See application file for complete search history.

(56) References Cited

U.S. PATENT DOCUMENTS 5,978,732 A * 11/1999 Kakitani et al. ............. 701/209
6,668,226 B2   12/2003 Sutanto
7,577,515 B2 *  8/2009 Nomura ...................... 701/200

FOREIGN PATENT DOCUMENTS

| EP | 1 496 338 A2 | 1/2005 |
|---|---|---|
| EP | 1 505 370 A1 | 2/2005 |
| JP | A 2004-301677 | 10/2004 |
| JP | A-2005-174198 | 6/2005 |

* cited by examiner

*Primary Examiner*—Yonel Beaulieu
(74) *Attorney, Agent, or Firm*—Oliff & Berridge, PLC

(57) ABSTRACT

Systems, methods, and programs obtain a start position and obtain map information including link information and mesh information, the mesh information dividing an area covered by the map information in a mesh grid having a plurality of adjacent meshes. The systems, methods, and programs calculate an estimated travel related time for specific ones of the meshes based on an origin mesh including the start position by assigning time offsets to specific ones of the meshes based on at least one of a type and a number of links entering the specific ones of the meshes starting from the origin mesh and in the order of transitions from one mesh to another mesh over mesh borders in a flow pattern representing increasing distances from the origin mesh.

20 Claims, 14 Drawing Sheets

SYSTEMS, METHODS, AND PROGRAMS FOR DETERMINING A TRAVEL-RELATED TIME

INCORPORATION BY REFERENCE

The disclosure of European Patent Application No. 05018099.1, filed on Aug. 19, 2005, including the specification, drawings and abstract thereof, is incorporated herein by reference in its entirety.

BACKGROUND

1. Related Technical Fields

Related technical fields include systems, methods, and programs that determine a travel-related time, such as, for example, navigation systems, methods, and programs.

2. Description of Related Art

Navigation systems using a travel time database that provides the time likely needed to travel through each section/link of a corresponding road network are known. In such conventional navigation systems, every link in the search area must have an individual time slice, i.e. an assigned travel time that depends on the arrival time at the starting point of the link. The individual time slice varies with the arrival time. FIG. 11 shows an example of the time slice (link travel time) for one link over the time of a day. A corresponding travel time database typically includes such data on a 24-hour/7-days-a-week base. In route searching applications, the time slice to be used for each link is unknown before the time slice of the previous link is decided, as it is clear from FIG. 12.

EP 1 496 338 A2 describes another approach for route searching, wherein statistically processed historical traffic data is used for a timeslice-based route searching. The system is based on a client-server-structure, in which all the possible departure and destination location/time combinations are considered and stored as pre-calculated data sets. At the time of a calculation request for a corresponding time slice to be used for calculation, the corresponding data set will be sent from the server with all the necessary information.

JP 2004-301677 A describes another approach for a timeslice-based route searching based on statistically processed historical traffic data, wherein the arrival time for a specific mesh-area is calculated using the distance between the target mesh and the departure mesh, after a corresponding destination was defined.

SUMMARY

In the conventional systems in which the individual time slice varies with the arrival time, the time slice to be used for each link is unknown before the time slice of the previous link is decided. Thus, the systems require the pre-calculation and the storage of enormous data amounts, which in turn requires a lot of processing power to be embedded in the system in order to perform, for example, route searching and/or travel time estimations.

The systems of EP 1 496 338 A2 and JP 2004-301677 also require the pre-calculation and the storage of enormous data amounts.

Various exemplary implementations of the broad principles described herein provide systems, methods, and programs that may determine a travel-related time that may reduce the required embedded processing power and/or the required pre-calculated and/or pre-stored data amounts when used, for example, in navigation or other location based applications.

Various exemplary implementations provide systems, methods, and programs that may obtain a start position and may obtain map information including link information and mesh information, the mesh information dividing an area covered by the map information in a mesh grid having a plurality of adjacent meshes. The systems, methods, and programs may calculate an estimated travel related time for specific ones of the meshes based on an origin mesh including the start position by assigning time offsets to specific ones of the meshes based on at least one of a type and a number of links entering the specific ones of the meshes starting from the origin mesh and in the order of transitions from one mesh to another mesh over mesh borders in a flow pattern representing increasing distances from the origin mesh.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Figure 1:
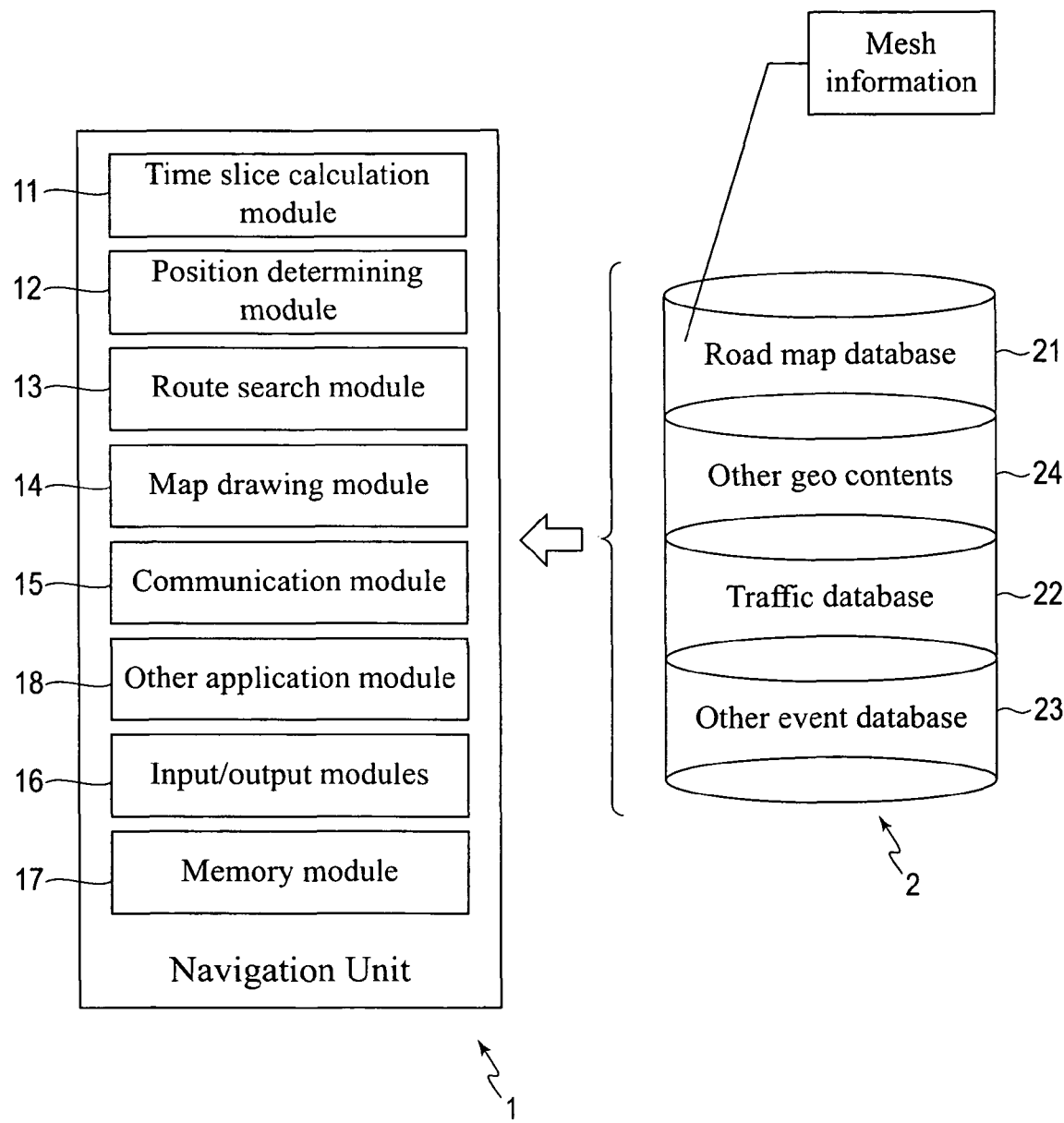
FIG. 1 is a schematic block diagram of an exemplary navigation system.

FIG. 1 is a schematic block diagram of an exemplary navigation system. As shown in FIG. 1, the navigation system may physically, functionally, and/or conceptually include, for example, a navigation unit 1 and a database 2.

The navigation unit 1, for example, a unit adapted to be used in a vehicle like a car, may physically, functionally, and/or conceptually include, for example, a time slice calculation module 11, a position determining module 12 (such as, for example, a GPS receiver), a route search module 13, a map drawing module 14, a communication module 15, an input/output module 16, a memory module 17, and/or other application modules 18. One or more of the time slice calculation module 11, the route search module 13, the map drawing module 14, the communication module 15, and/or the other application module 18 may be implemented as a controller, such as, for example, a CPU.

The database 2 may physically, functionally, and/or conceptually include, for example a road map database 21, a traffic database 22, an event database 23, and/or an other-geo-contents database 24. The road map database 21 may include, for example, road map data such as link data and/or node data, with additional mesh information.

As used herein, the term "link" refers to, for example, a road or portion of a road. For example, according to one type of road data in the map DB, each road may consist of a plurality of componential units called links. Each link may be separated and defined by, for example, an intersection, an intersection having more than three roads, a curve, a highway entry point, and/or a point at which the road type changes. As used herein the term "node" refers to a point connecting two links. A node may be, for example, an intersection, an intersection having more than three roads, a curve, a highway entry point, a dead end and/or a point at which the road type changes.

As used herein "mesh information" constitutes information and/or data that divide the area covered by the road map data into a mesh grid. The mesh grid may be a regular grid of meshes having a rectangular or other polygonal shape that define borders (e.g., edges and/or borderlines) between adjacent meshes of the mesh grid. For example, the meshes may be rectangular or square, with fixed sizes. However, other grids such as grids including meshes with triangular or hexagonal or other polygonal shapes may also be used. The following examples are described with respect to a mesh grid of square meshes having identical sizes for the sake of simplicity.

The traffic database 22 may include, for example, information to forecast traffic situations, such as statistically processed historic traffic data. The event database 23 may include, for example, time-relevant event information with respect to road links such as a concert at a concert hall, a football match in a sports stadium and so on.

The database 2 may be fully or partly included in the navigation unit 1, e.g. stored in the memory module 17 or parts of the database or the complete database may be stored in an external memory and accessed via the communication module 15.

For example, the navigation unit 1 may include at least the road map database with the mesh information such that the navigation unit may be capable of determining travel-related times like a travel time or an arrival time or a passing time (at which a certain geographical point is passed) using a mesh-based calculation.

The time slice calculation module 11 may be adapted to implement the time slice calculation (an example of which will be described later), based on the position of the vehicle determined by, for example, the position determining module 12 and/or any other position input by the user via a human machine interface or the like.

The result of the time slice calculation performed by the time slice calculation module 11 may then be used in subsequent processes by, for example, the route search module 13, the map drawing module 14, and/or other modules.

Figure 2A:
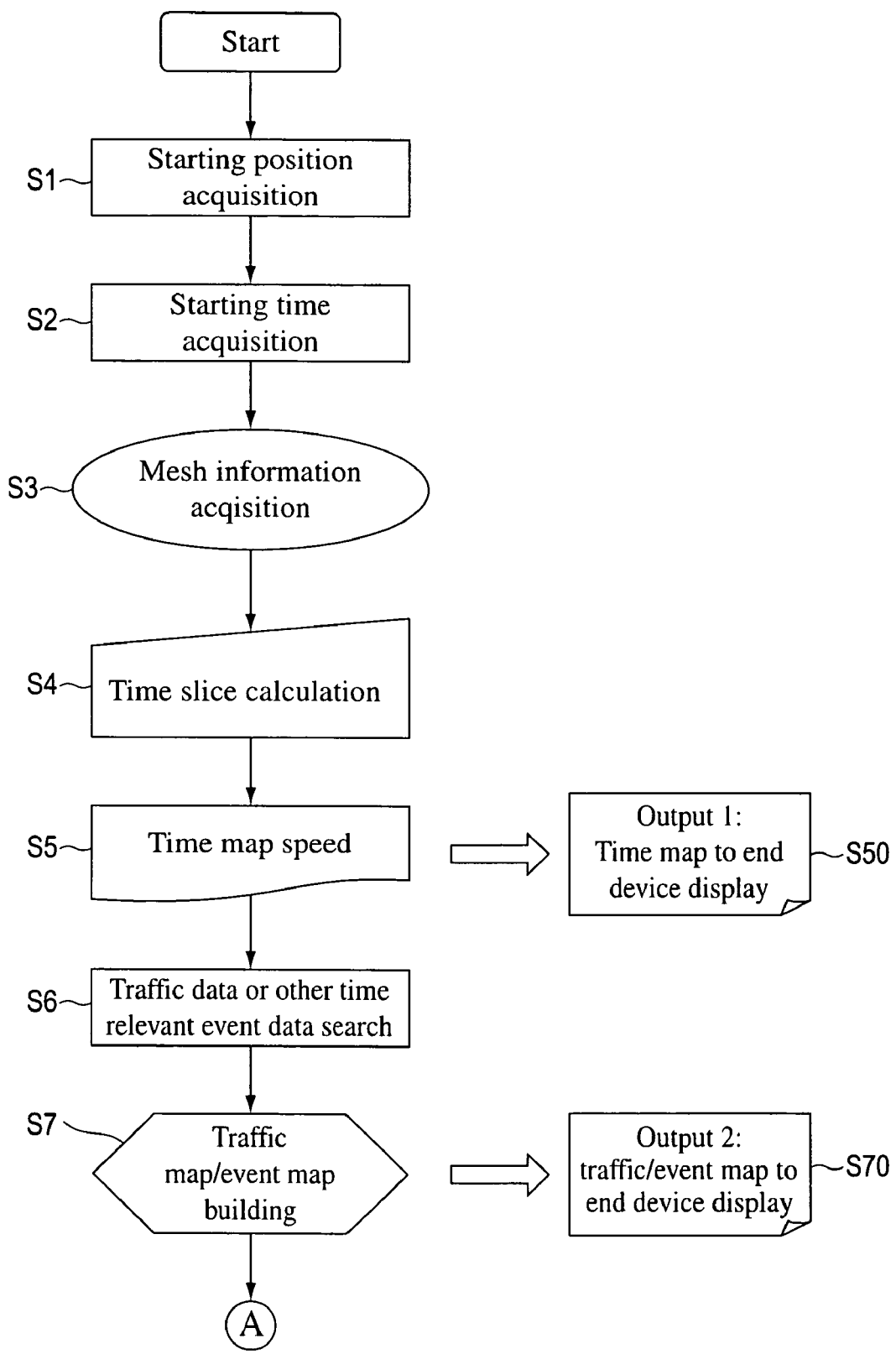
FIGS. 2(a) and 2(b) are a flow chart of an exemplary method.
Figure 2B:
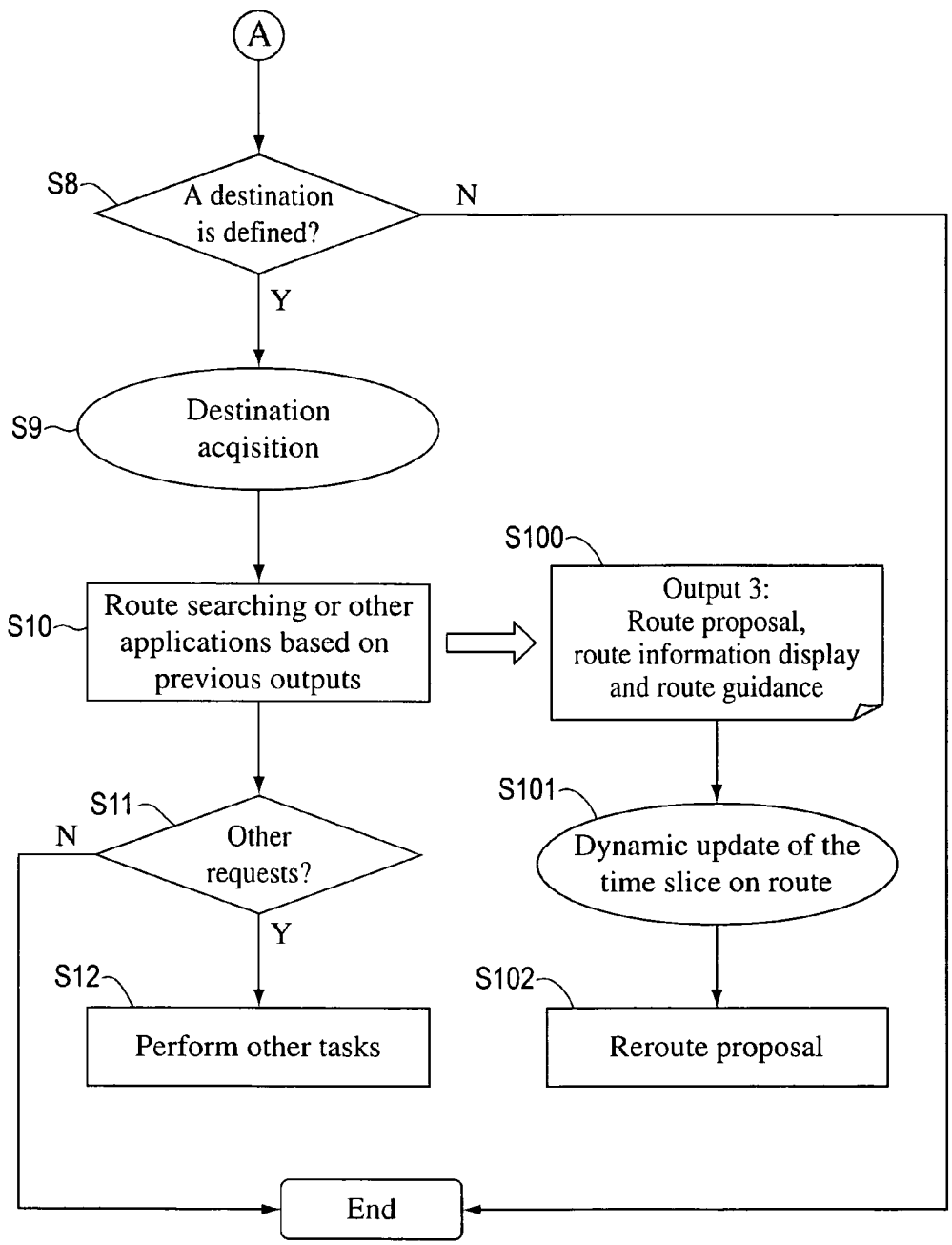

FIGS. 2(*a*) and 2(*b*) show an exemplary method for determining a route. The exemplary method may be implemented, for example, by one or more components of the above-described navigation system. However, even though the exemplary structure of the above-described navigation system may be referenced in the description, it should be appreciated that the structure is exemplary and the exemplary method need not be limited by any of the above-described exemplary structure.

After start of the operation, the (start) position to be used in the calculation and the starting time for the corresponding calculation are acquired in steps S1 and S2. In step S3, the mesh information is acquired from road map database 21. If the application does not consider the starting time, step S2 is not necessary.

In step S4, a time-slice calculation is performed by the time-slice calculation module 11, for example, in a manner described further below. The result of the time-slice calculation of step S4 is used to spread (generate) a time map in step S5. A correspondingly generated time map may be optionally output on a display such as a display included in the input/output module 16 in step S50.

Figure 8:
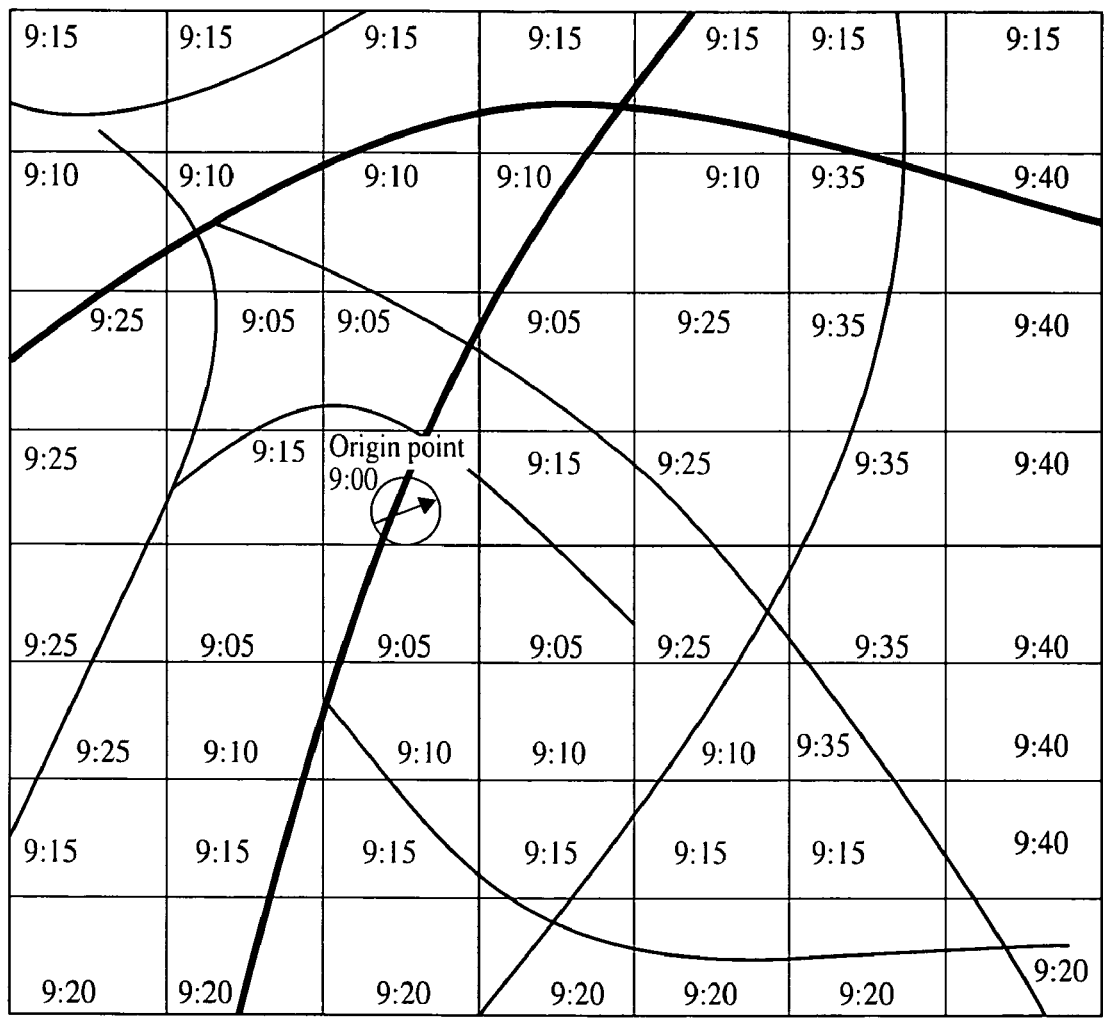
FIG. 8 shows an example of a time map.

If the output of a time map, an example of which is shown in FIG. 8, was the intended final result of the process, the process flow will skip from step S50 to the END. Otherwise or alternatively, i.e., if a more sophisticated application is run, the results of the time slice calculation of step S4 can be used together with traffic data or other time relevant event data (for example, searched in and acquired from traffic database 22 and/or event database 23) in step S6 to generate the traffic and/or event map in step S7 (for example, as described in greater detail below. Such a traffic and/or event map can be output in step S70. Of course, on either map, travel times (15 min, . . . ) could be displayed instead of arrival/passing times (9:00; 9:10; etc.).

Additionally or alternatively, the data obtained in the time slice calculation of step S4 can be used for route searching or other applications as shown in FIG. 2(*b*). If a destination is defined (i.e. YES in step S8), the relevant data on the destination are acquired from database 2 in step S9.

In step S10, a route searching and/or other applications based on the results of the previous steps may be performed. Specifically, for example, the route searching may obtain traffic information (e.g., traffic jam, congestion, and/or traffic regulations) when the vehicle will travel on the link based on the result of the time slice calculation. Thus, the system may calculate the const of a route to the destination based on the obtained traffic information and determine a route for guidance. The results, such as a route proposal, route information display and/or route guidance can be output in step S100, for example, on the display or as audio output and the like.

Optionally, in step S101, a dynamic update of the time slices of the route based on updated position and time data can be made. Furthermore, optionally in step S102, a re-route proposal or the like can be made, based on updated position and time information. The dynamic update in step S101 and the re-route proposal processing in step S102 can be performed using either a conventional time slice technique or alternatively the results of an updated time slice calculation according to step S4.

Figure 3:
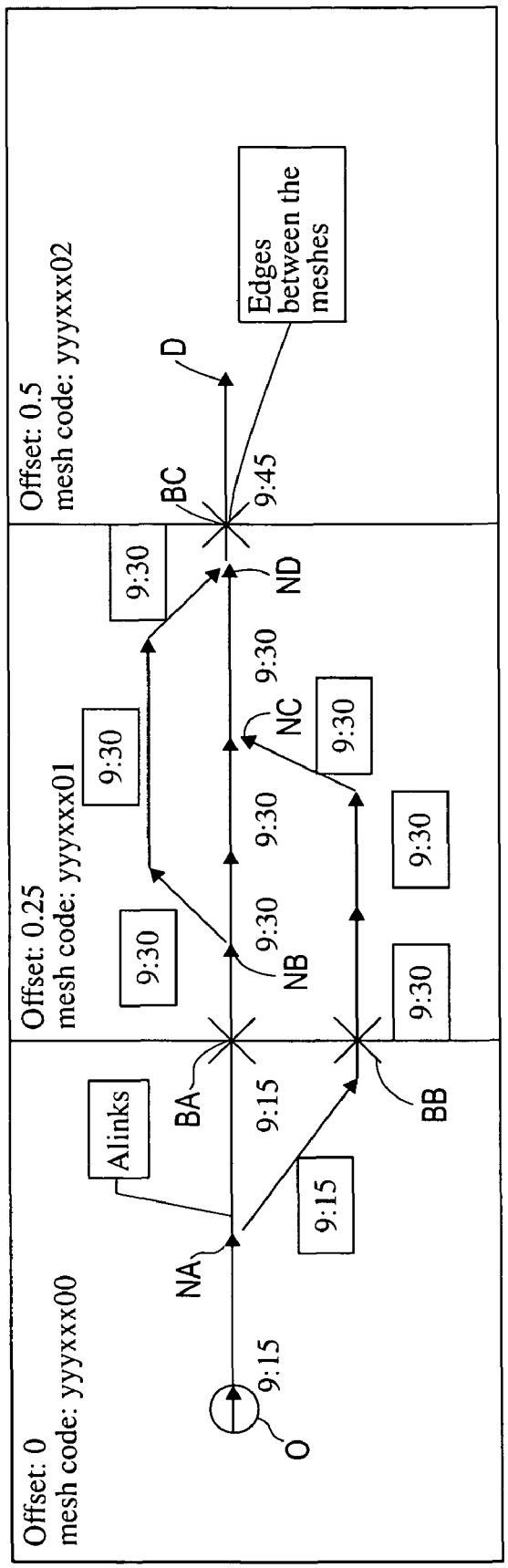
FIG. 3 shows a representation of an exemplary method.

An exemplary mesh-based calculation method is explained referring to FIG. 3. Such an exemplary method may be used, for example, in step S4 to make time-slice calculations. The exemplary method may be implemented, for example, by one or more components of the above-described navigation system. However, even though the exemplary structure of the above-described navigation system may be referenced in the description, it should be appreciated that the structure is exemplary and the exemplary method need not be limited by any of the above-described exemplary structure.

FIG. 3 shows three adjacent square meshes, namely mesh yyyxxx00, yyyxxx01 and yyyxxx02. Mesh yyyxxx00 is the mesh including the starting point, and thus is the origin mesh. The meshes are separated by edges or borderlines.

The time offset 0 is assigned to origin mesh. A specific offset is assigned to the remaining meshes. For example, in FIG. 3 the offset value 0.25, is assigned to mesh yyyxxx01, a neighbor to the origin mesh. The offset value 0.25 is a value that may be multiplied with a time standard (1 hour in the present example), such that the time offset of mesh yyyxxx01 may be calculated as 0.25×60 min.=15 min. In the simple example shown in FIG. 3, only one direction of transit from one mesh to the next mesh is shown. In the example of FIG. 3, it is the transit direction from the origin mesh via the neighbor mesh yyyxxx01 to mesh yyyxxx02. The offset value 0.5 is assigned to mesh yyyxxx02. Thus, considering the time standard of 1 hour, an offset time of 30 min. may be assigned to mesh yyyxxx02.

Before explaining how the offset values are calculated, the classification of the roads (links) shown in FIG. 3 will be explained. The road from the origin point O in mesh yyyxxx00 via nodes NA, NB, NC, ND to the destination D is a high-class road such as a highway or motorway allowing high speeds that will be road type and offset type H. The road from node NA via the border point BB to node NC is considered to be a mid-class road being road type and offset type M. The road connecting nodes NB and ND bypassing node NC is a low-class road being classified as road type and offset type L.

Furthermore, it is assumed as exemplary non-limiting examples that offset type H equals an offset value of 0.25, offset type M equals an offset value of 0.4, and offset type L equals an offset value of 0.7.

In the most simple implementation of the mesh-based calculation, one offset value is assigned to each mesh, which is the smallest possible offset value depending on the classification of the roads entering the mesh in the direction of transition. That means, in case of FIG. 3, the direction of transition is the direction from origin point O to destination D. Accordingly, at the borderline between mesh yyyxxx00 and mesh yyyxxx01, there are two links crossing the edge (borderline), namely a link of type H at borderline crossing point BA and a link of type M at borderline crossing point BB. Accordingly, the mesh (i.e. all links in the mesh) will receive the offset value for road type H, i.e. the offset value 0.25.

Obviously, as only one road is crossing the borderline between mesh yyyxxx01 and yyyxxx02, namely a link of type H, mesh yyyxxx02 receives offset value 0.25, if only the offset in respect to the previous mesh is considered. As the method aims at an estimation of travel time based on the point of origin, the offset value for a mesh is calculated according to the following formula (1)

$$Offset_{mesh\,n} = \sum_{n}^{i=1} RelativeOffset_{mesh\,i} \quad (1)$$

Where $Offset_{mesh\,n}$ is the offset for a particular mesh, n meshes away from the origin mesh, and mesh 0 is the origin mesh, and mesh 1 is the neighbor mesh to the origin mesh, and the meshes along a path are numbered consecutively from the origin mesh to mesh n. In a similar manner, the offset of mesh n may be calculated by adding the relative offset of mesh n to the offset of mesh n−1.

In the present case, the offset value of mesh yyyxxx02 (n=2) is its relative offset+the relative offset of mesh yyyxxx01 (n=1). Thus, the offset value of mesh yyyxxx02 is 0.25+0.25=0.5.

Assuming that the link between node ND and destination D is a link of type L (instead of type H), the relative offset value for mesh yyyxxx02 would be 0.95 (0.25+0.7).

Figure 4:
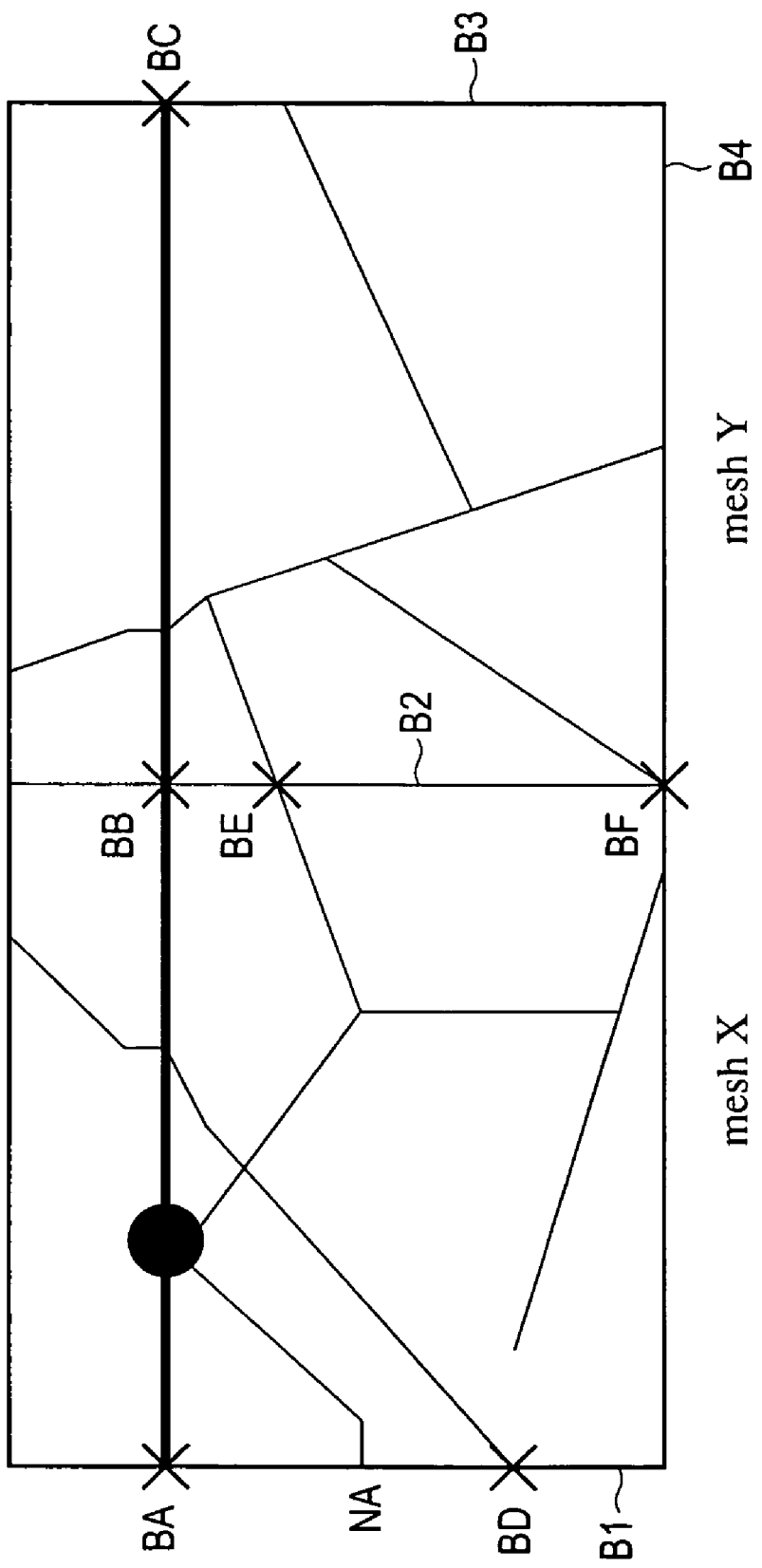
FIG. 4 is a representation of two adjacent meshes.

A modification of the above method will be explained referring to FIG. 4. FIG. 4 shows one mesh X and one adjacent mesh Y. The direction of a transition considered in this example is from borderline B1 via borderline B2 to borderline B3. The road (links) from borderline crossing point BA via borderline crossing point BB to borderline crossing point BC is a link of type H. Node NA is an exit from this link of type H to a link of type M.

In the first approach (described above with respect to FIG. 3), in the time slice calculation of step S4, all links within one mesh are considered together and the mesh receives a single offset value. Accordingly, there was only one common offset for all links of one mesh. However, in reality, there usually is a variety of different links in the road network even within one mesh. The precision of the mesh-based calculation may be improved by considering such a variety.

In the example shown in FIG. 4, in addition to the type of the roads coming in via a specific borderline, also the connection of the links of different types within the mesh may be considered. For example, the basic information that may be used for this purpose is the availability and optionally the number of exits from the links of type H, i.e. of high-class link exits. In the example shown in FIG. 4, mesh X includes such a high-class link exit, namely node NA.

Figure 5A:
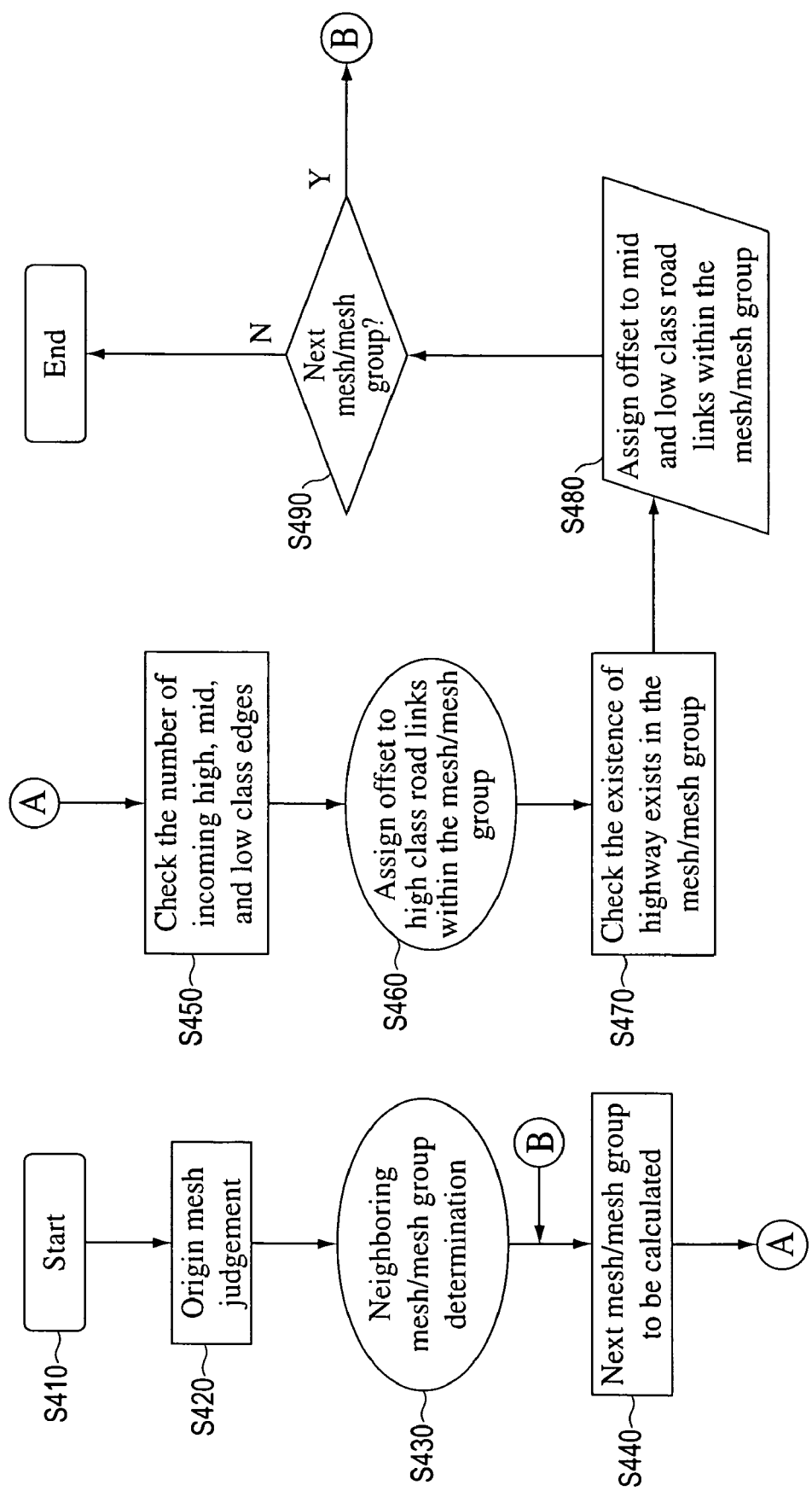
FIGS. 5(a) and 5(b) are flow charts showing a exemplary method.
Figure 5B:
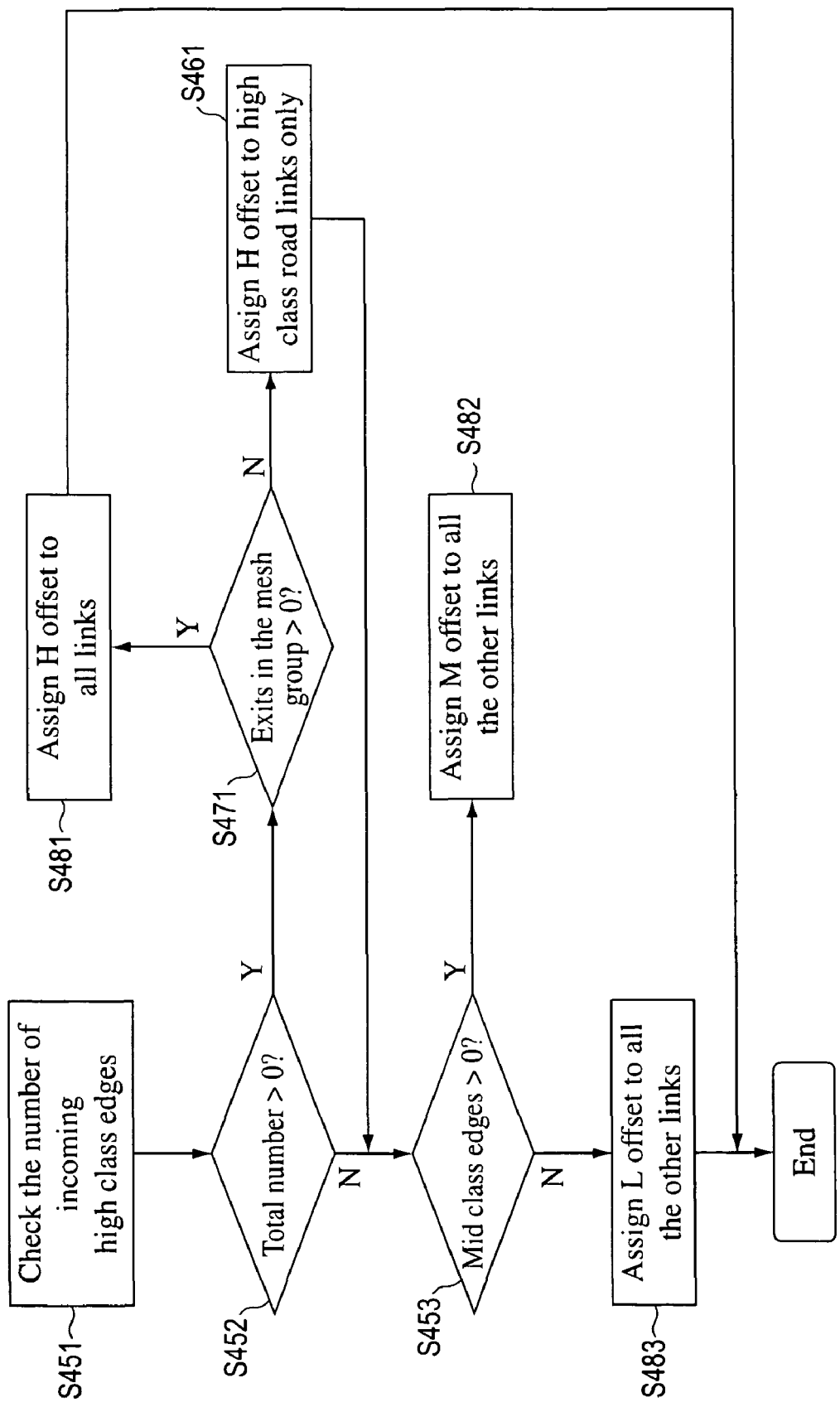

In the example of FIG. 4, one mesh may receive up to three different offset values for the different types of links included in the mesh as explained with respect to FIGS. 5(a) and 5(b). Referring to FIG. 5(a), the time slice calculation (e.g., used in step S4 of FIG. 2(a)) starts in step S410. First, in step S420, the origin mesh is determined. In step S430, a neighboring mesh/mesh group is determined (e.g., according to examples explained below). In step S440, one of the mesh/mesh groups determined in step S430 is selected to perform the time slice calculation.

In step S450, the number of incoming links via the edges (borderlines) for each of the different link classes H (high), M (mid) and L (low) is determined. For example, mesh X has one incoming link of type H at borderline crossing point BA and one incoming link of type M at borderline crossing point BD, if the borderline B1 is considered. Mesh Y, considering borderline B2, has one incoming link of type H at borderline crossing point BB, one incoming link of type M at borderline crossing point BE, and one incoming link of type L at borderline crossing point BF.

In step S460, the offset value for links of type H is assigned to the corresponding links within the meshes of the selected mesh/mesh group (selected in step S440).

Then, in step S470, the existence of high-class link exits such as node NA in the meshes of the mesh/mesh group is checked. Accordingly, one high-class link exit is found in mesh X but no high-class link exit is found in mesh Y. In step S480, offsets are assigned to the links of type M and L within the meshes of the mesh/mesh group.

The steps S450 to S480 may be performed, for example, by the exemplary method shown in FIG. 5(b), explained below. Following to step S480, it is determined whether there is a next mesh/mesh group to be considered. If YES, the process flow returns to step S440 as shown by arrow B. If NO, the time slice calculation ends.

FIG. 5(b) shows an exemplary method of implementing of steps S450 to S480. As can be seen from FIG. 5(b), the order of checking and assigning need not be identical to the order in steps S450 to S480, thus neither order need be limiting of the methods.

In step S451, the number of incoming links of type H at a specific borderline (edge) is checked. If the total number of incoming links of type H is larger than 0 (i.e. at least one incoming link of type H is present) (YES in S452), the number of exits from links of type H in the meshes of the mesh group is checked in step S471. If, in step S471, there is an exit from a link of type H in a corresponding mesh (YES in S471), operation continues to step S481. In step S481, the offset of type H (in the above example 0.25) is assigned to all links (of types H, M and L) in the corresponding mesh and the exemplary process ends.

If, in step S471, no exit from a link of type H in the corresponding mesh is found (NO in S471), operation continues to step S461. In step S461, the offset of type H is assigned only to the links of type H in the corresponding mesh, and the process flow continues to step S453. The process also continues to step S453, if the number of incoming links of type H was 0 in steps S451 and S452.

In step S453, it is determined whether the number of incoming links of type M is larger than 0. If YES, the offset of type M is assigned to all links (in case of NO in step of S452) or to all other links (in case of NO in step S471) in the corresponding mesh in step S482. Then, the process ends.

If the determination in step S453 is NO, i.e., if no incoming links of type M are detected in step S453, the process assigns the offset of type L to all or all other links in step S483.

As mentioned above, the exemplary method shown in FIG. 5(b) is only an example. For example, in other methods, the number of exits from links of type H, or the presence and/or the number of exits from links of types M may be considered.

Based on the above example, when mesh X is entered via a link of type H, the total travel speed also on a link of type M connecting node NA and borderline crossing point BE is higher as if the total travel in mesh X was done on links of type M or L only. On the other hand, if mesh Y, if mesh Y is entered via borderline crossing point BB, there is no possibility to change to a link of type M or L, such that these links can not benefit from the higher travel speed on the link of type H.

In the above example, different offsets may be assigned to links of different type in the same mesh. The assignment of different offsets for different types of links need not be limited to the consideration of the presence of exits or the like. Of course, different offsets can be assigned to links of different type in the same mesh also without considering the presence of exits or the like.

Figure 6:
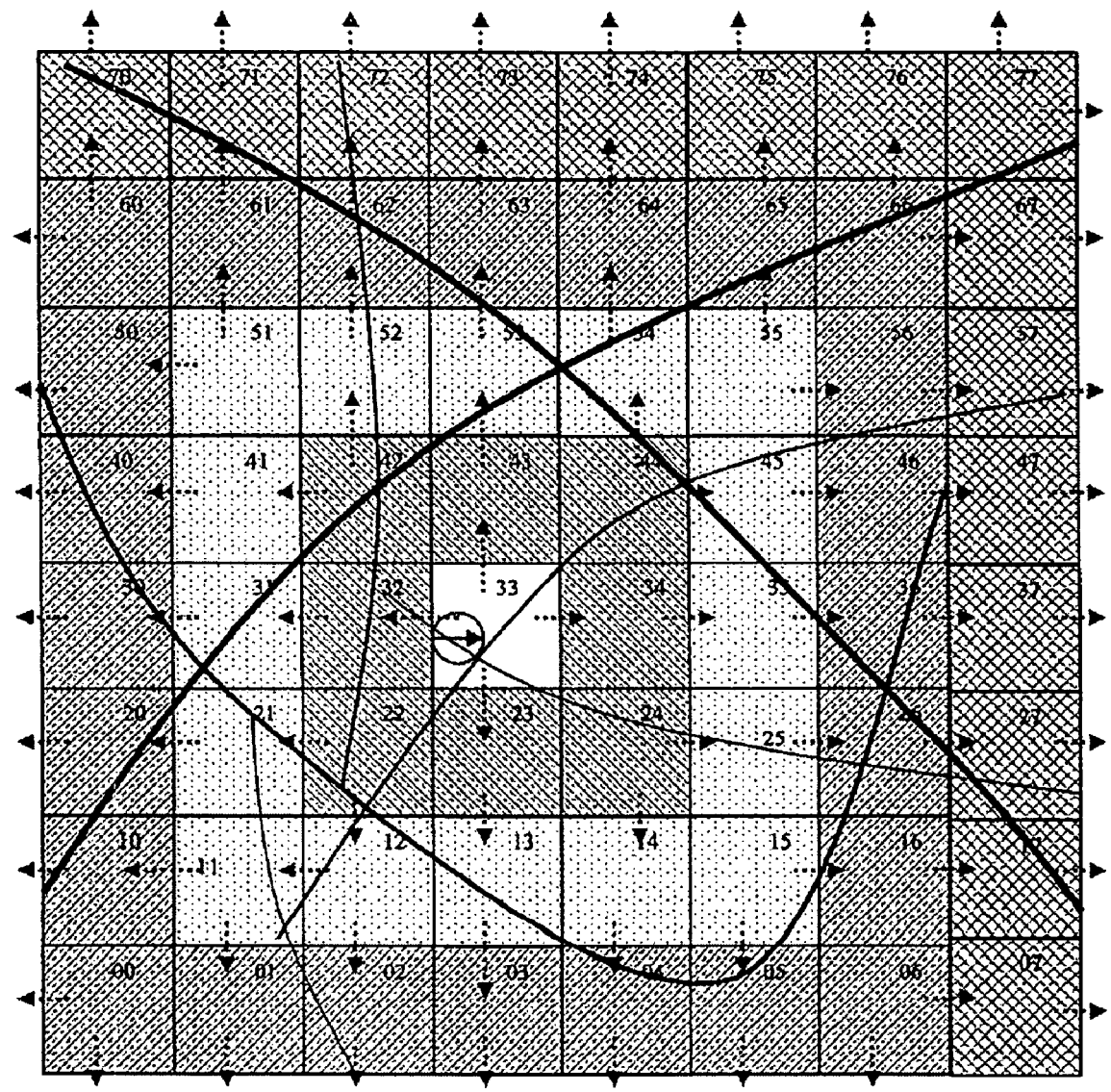
FIG. 6 shows an example of assigning offsets to groups of meshes.

Next, an exemplary method for calculating the offset values for the meshes is described with respect to FIG. 6. The example described with respect to FIG. 6 is another of the examples mentioned above with respect to the neighboring mesh/mesh group determination made in step S430. The exemplary method may be implemented, for example, by one or more components of the above-described navigation system. However, even though the exemplary structure of the above-described navigation system may be referenced in the description, it should be appreciated that the structure is exemplary and the exemplary method need not be limited by any of the above-described exemplary structure.

FIG. 6 shows a mesh grid portion consisting of a matrix of 8×8 meshes, i.e. 64 meshes. The starting position obtained in step S1 is located in mesh 33. The meshes are square. Accordingly, each mesh has four borderlines to its neighbors, which are represented by the adjacent sides of the squares. Thus, the origin mesh 33 including the starting position has four borderlines and that there are outgoing links only crossing these four borderlines. The time offset 0 is assigned to origin mesh 33.

The flow pattern shown in FIG. 6 represents an increasing distance of the meshes from the origin mesh according to one or more of the following principles:

a) Each mesh (except the origin mesh) has only two borderlines where the links crossing the borderlines are considered.

b) If there are incoming links in one mesh, the borderline opposite to the borderline having the crossing incoming links will be determined to be the borderline having the outgoing links.

c) In a mesh having no incoming links (which are the meshes on the diagonal lines intersecting the origin mesh), the borderlines having outgoing links are selected to be the ones continuous to borderlines of neighboring meshes having outgoing links.

Accordingly, the flow pattern represented by the arrows in FIG. 6 represents transitions from one mesh to an adjacent or neighboring mesh in the order of transitions representing a flow pattern of increasing distance. With respect to those meshes having no incoming links (all the "corner meshes" 00, 11, 22, 44, 55, 66, 77, 06, 15, 24, 42, 51, 60 located on diagonal lines intersecting the origin mesh 33), it has to be considered that these meshes have no incoming links which are considered, and that they have the same "distance" from the origin mesh as the meshes located between two "corner meshes" in the same line or row of the matrix. Accordingly, these "corner meshes" also represent meshes in the flow pattern representing an increasing distance from the origin mesh.

The assignment of offset values to each of the meshes may be done, for example, according to the calculation described with respect to step S4.

In this case, a solution can to be found for the "corner meshes," even though these corner meshes do not have incoming links, which would otherwise make the calculation of an offset value based on the upstream mesh and the incoming links impossible.

An exemplary approach for assigning offset values to the "corner meshes" may include assigning the lower offset value of the next neighbors of the same distance in the flow pattern to the corner mesh. For example, in case of corner mesh 42, the lower offset value of either meshes 32 and 43 may be assigned to mesh 42.

Alternatively, for example, offset values for corner meshes may be assigned by assigning of the same value to all meshes arranged on the same side (north, west, south, east) of the origin mesh on the same level of distance from the origin mesh. This same value may be the lowest value of all mesh values of these meshes arranged on the same side at the same level of distance. For example, meshes 25, 35, 45 are arranged on the same side (east, assuming the top of the figure is north) of origin mesh 33 at the same level of distance (represented by the same hatching). Assuming that the offset value for mesh 25 is 0.8, the offset value for mesh 35 is 1.4, and the offset value for mesh 45 is 0.65, the lowest mesh value (0.65 of mesh 45) may be assigned to each of meshes 25, 35 and 45. Correspondingly, meshes of the same level of distance in the flow pattern on the north side, i.e. meshes 52, 53, 54, may have the same offset value, too, e.g., 0.5. Then, the lower of the two available mesh values, namely 0.5, may be assigned to corner mesh 55. Thus this example may be based on one or more of, the following additional principles:

d) Assigning one value to all meshes located at the same level of distance on the same side of the origin mesh according to a specific selection rule such as the highest of the values for these meshes or the lowest of the values of these meshes or the average value.

e) Assigning an offset value to a corner mesh selected from the offset values of the neighboring meshes of the same level of distance according to the same as in d).

In the flow pattern shown in FIG. 6, for example, different offsets may be assigned for different types of links in one mesh to reflect the type of links, the number of exits in the mesh and so on. Furthermore, for example, after the group determination in step S430, the number of incoming links for all meshes of the group may be taken to assign offsets to the meshes of the group instead of the number of incoming links per individual mesh.

Figure 7:
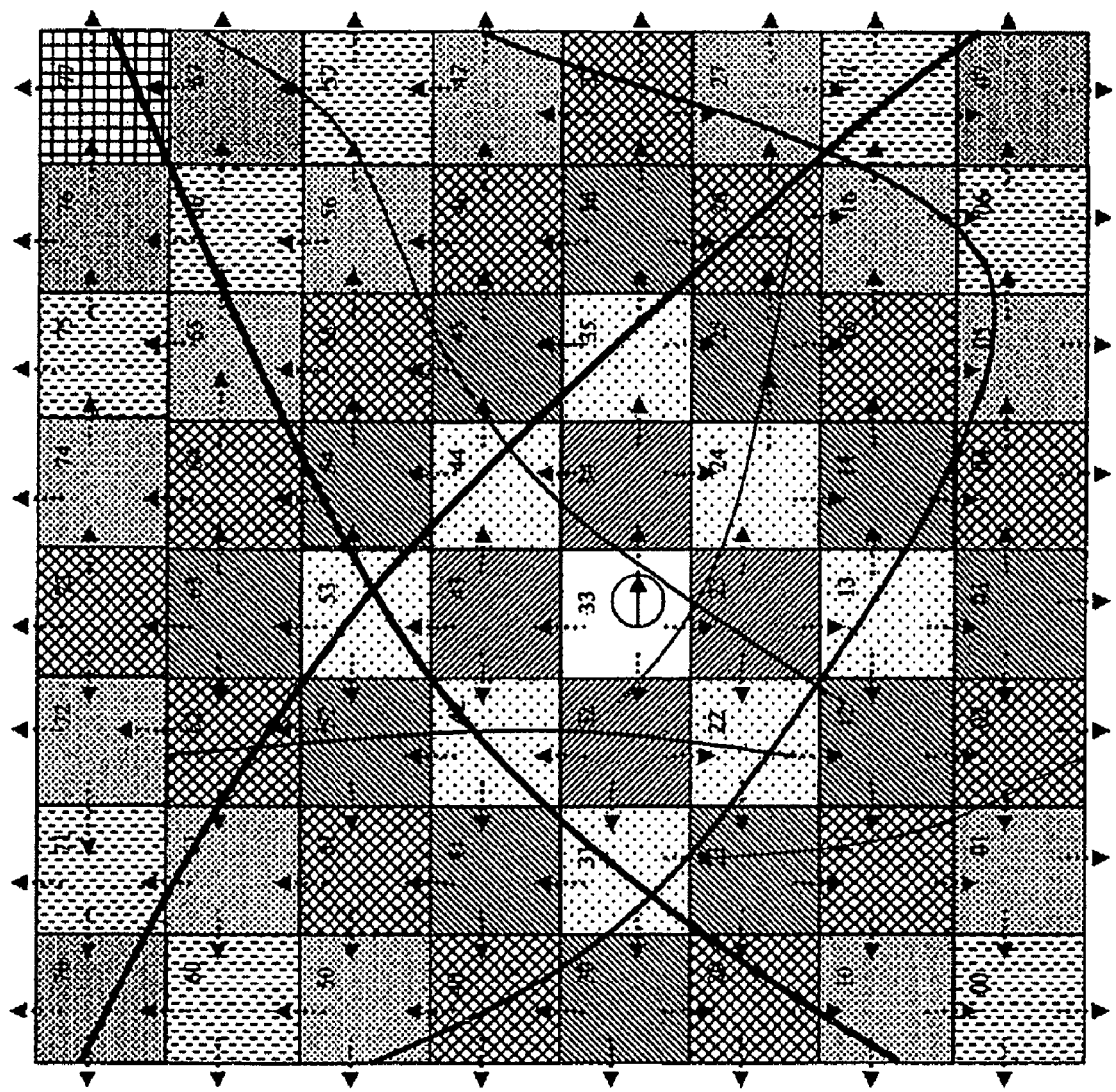
FIG. 7 shows an example of assigning individual offsets to each mesh.

Another exemplary method of the neighboring mesh/mesh group determination of step S430 is described with respect to FIG. 7. The exemplary method may be implemented, for example, by one or more components of the above-described navigation system. However, even though the exemplary structure of the above-described navigation system may be referenced in the description, it should be appreciated that the structure is exemplary and the exemplary method need not be limited by any of the above-described exemplary structure.

In FIG. 7, each borderline between adjacent meshes may be considered as a borderline having incoming or outgoing links. Therefore, there are no "corner meshes" as in the flow pattern shown in FIG. 6. The flow pattern shown in FIG. 7 is also a flow pattern representing an increasing distance from the origin mesh, where the increasing distance is represented by the number of borderlines crossed in a flow starting from the origin mesh.

Accordingly, the meshes 23, 32, 34, 43 may be considered at the same level of distance from the origin mesh 33. The meshes 13, 22, 24, 31, 35, 42, 44, 53 may be considered at a next level of distance from the origin mesh. The meshes 03, 12, 14, 21, 25, 30, 36, 41, 45, 52, 54, 63 may be considered at the next level of distance and so on.

In the flow pattern shown in FIG. 7, the same procedures for calculating and assigning offset values as described with respect to step S4 may be used. Thus, individual offset values may e assigned to each mesh. Furthermore, assigning identical mesh values according to the level of distance may also be used.

In FIGS. 6, 7, the neighboring mesh/mesh group determination of step S430 and the next mesh/mesh group selection of step S440 may be considered as follows. In FIG. 6, if each of the meshes receives an individual value, the neighboring mesh/mesh group determination may be done in the flow sequence. That means, meshes 33, 34 may be grouped or alternatively, all the meshes in one direction of flow, that means, at first, meshes 33, 43, meshes 33, 34, meshes 33, 23, and meshes 33, 32 are grouped and the corresponding offset values may be calculated. Then, the mesh values for the corner meshes 22, 24, 42, 44 may be calculated. Then, meshes 22, 12, meshes 23, 13, meshes 24, 14, meshes 24, 25, meshes 34, 35, and so on are grouped and the corresponding offset values are calculated and assigned. Then, the offset values for the corner meshes 11, 15, 51, 55 may be calculated, and the process continues according to this logic. If common offset values should be assigned to all meshes at the same level of distance at one side of the origin mesh, this intermediate step may be done before calculating the values of corner meshes.

In FIG. 7, the determination of step S430 may be done in a similar way. That is, at first meshes 33, 23, meshes 33, 32, meshes 33, 43 and meshes 33, 34 may be grouped and the corresponding offset values may be calculated and assigned. Then, whether the group determination is already done beforehand or not, the groups of meshes 23, 22, meshes 23, 13, meshes 23, 24, meshes 32, 22, meshes 31, 21, meshes 32, 42, meshes 34, 24, meshes 34, 35, meshes 34, 44, meshes 43, 42, meshes 43, 53 and meshes 43, 44 may be calculated and assigned, and so on. Again, one single offset value per mesh or a plurality of offset values for different types of links with the possibility of considering other factors such as the numbers of exits and so on as already described can be used in calculating and assigning the offset values. In FIG. 7, each of the meshes, except the origin mesh and the meshes (23, 32, 34, 43) having common borderlines with the origin mesh, has two borderlines with incoming links. Therefore, in order to be able to assign one offset value or one offset value for the specific type of links in the mesh, it is necessary to specify which of the values has to be selected. This can be done, for example, by assigning the lower one, the higher one, or the average, of the offset values resulting from the two borderlines.

Figure 9:
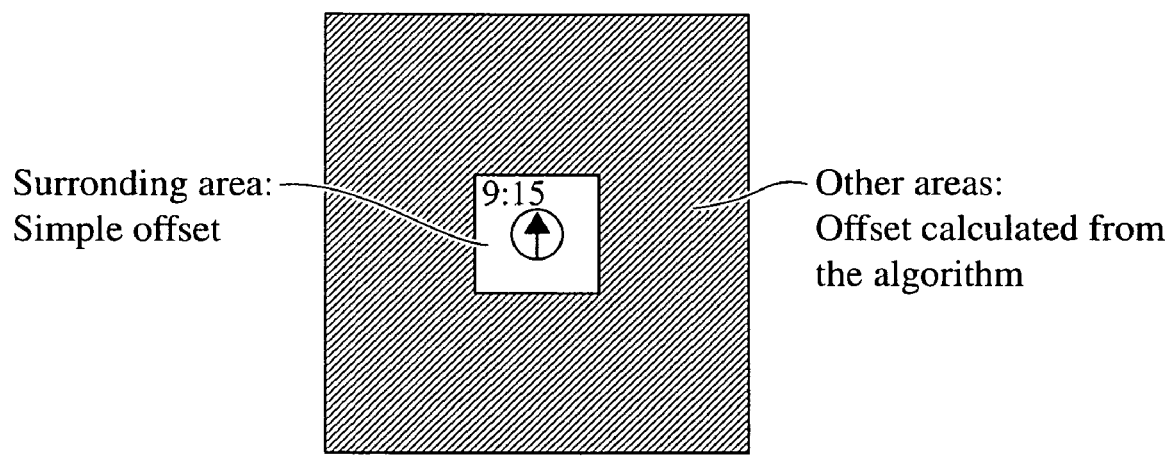
FIG. 9 shows an example of treating the surrounding area of the origin point.

With respect to the origin mesh or the surrounding area of the starting position, it is possible that a differentiation of the link (road) classes may not be necessary because of the limited distance or the limited possibilities of access to the road network. Therefore, for example, a simple offset may be assigned to the surrounding area, which can consist of a certain number of meshes around the origin mesh, without considering the number or the type of incoming links. FIG. 9 shows such an example.

Furthermore, for example, the offset calculation may consider a user preference in using the link type. For example, if the user preference is using highways or motorways, i.e., links of type H, or if the user preference is using the shortest route, or the like, this can be considered in calculating the mesh offsets.

In the first case, for example, the offset value may be reduced for the links of the preferred class. It can be reduced in comparison to the normal offset value described above. It is also possible to simply neglect certain other link classes, where possible.

Figure 10:
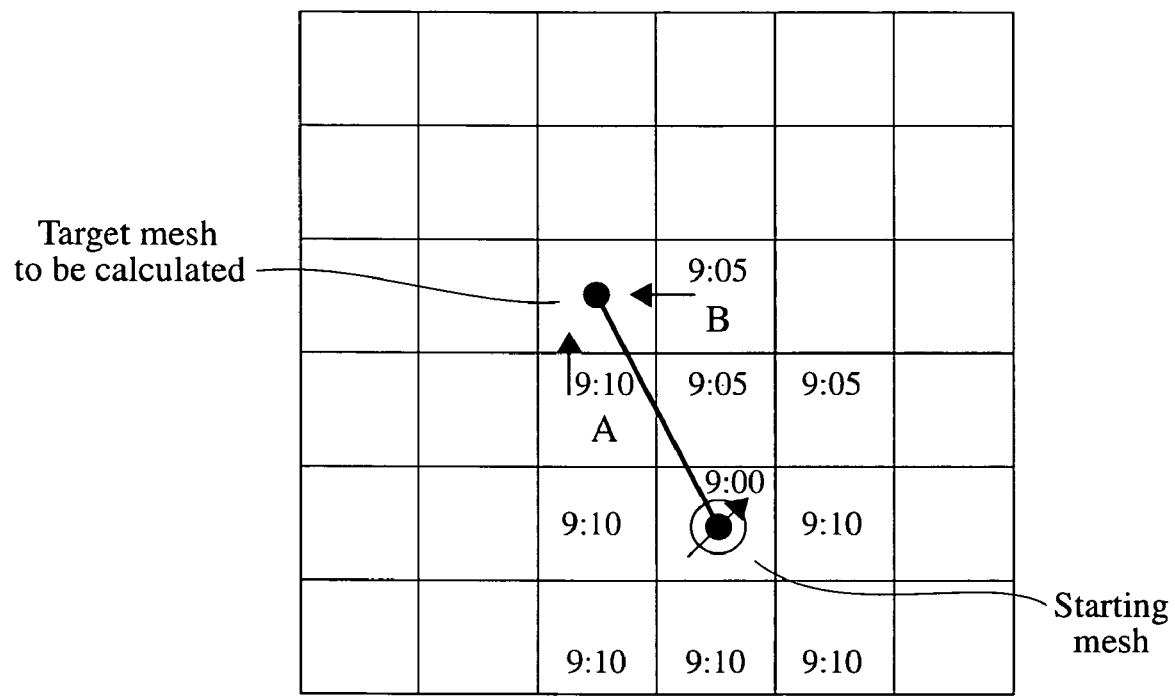
FIG. 10 shows a representation of an exemplary short route searching.
Figure 11:
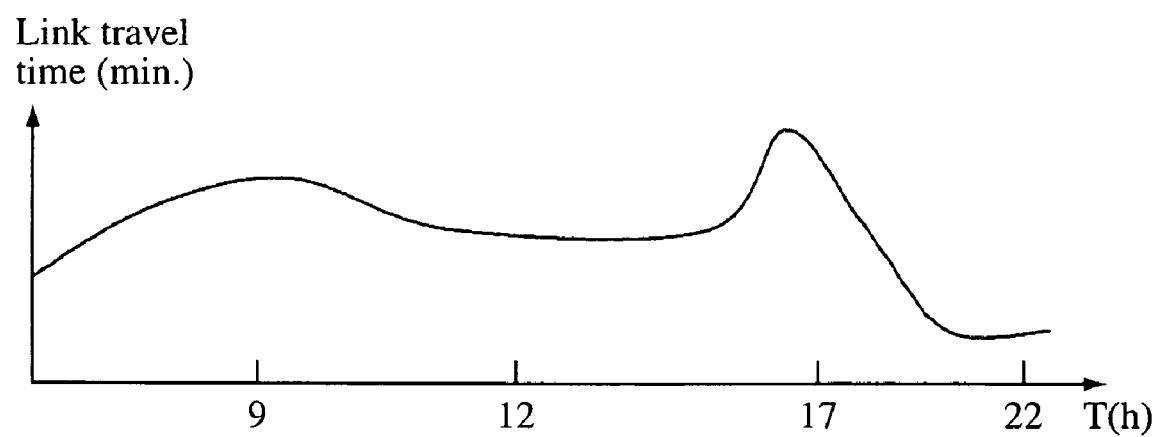
FIG. 11 shows an example of varying travel time for a single link.
Figure 12:
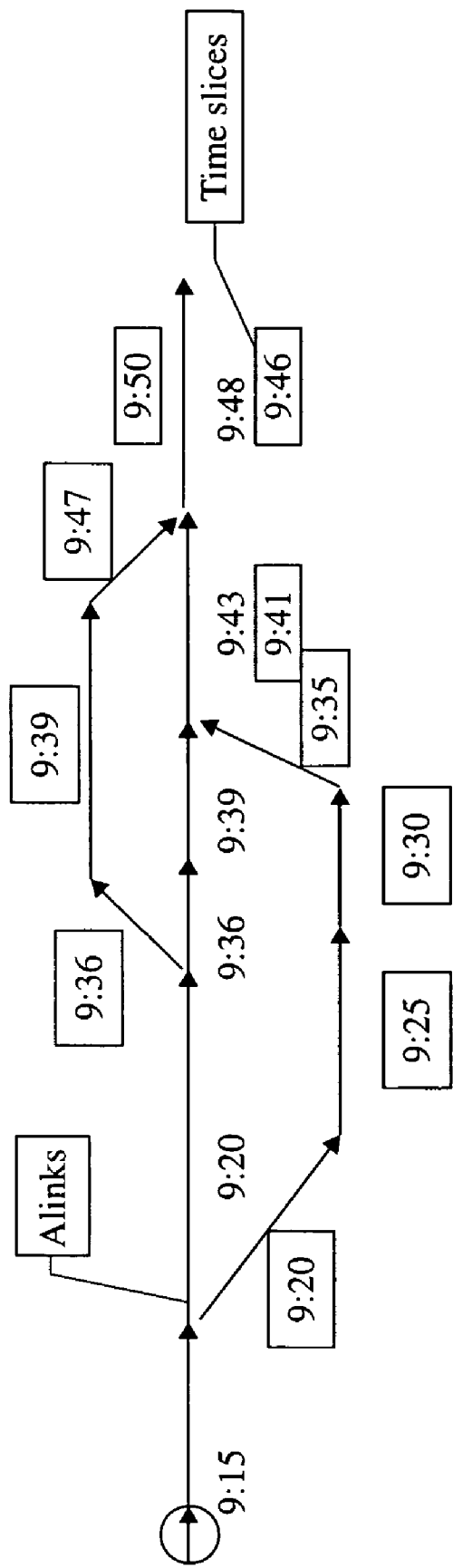
FIG. 12 shows a conventional time slice approach for route searching.

If the user preference is the shortest route, one possibility of adapting the method is the technique shown in FIG. 10. The straight line between the origin mesh including the starting position (starting mesh) and the mesh including the destination (target mesh), e.g., the straight line between the centers of the two meshes or the straight line between the starting point and the destination or the like, may be drawn. Then, as can be seen in the example of FIG. 10, it has to be decided which of the two offset values, the one of mesh A or the one of mesh B, are selected for the calculation of the offset value for the target mesh. Since the user has the preference of the shortest route, the value of mesh A may be selected because the straight line crosses mesh A, even though the offset value of mesh B may be smaller.

A traffic and/or event map as mentioned with respect to steps S7, S70 includes, for example, the traffic forecast, e.g., by different coloring of the corresponding routes, time relevant information (e.g., a football match, holiday traffic flow, etc.) by predefined icons placed on the displayed map, and so on. Therefore, a user can see, if the user wants to start at point A at time T1 to be at point B to attend a concert at time T2, that there will be a traffic jam at point C because of a football match, if road X is used. This can help the user to plan his/her time and to make a decision even without using a route search function.

According to the above examples, it is possible to calculate time slices to be used for an route searching or, as far as arrival time estimation to any target area is concerned so as to estimate the traffic situation up to the target area in a reasonably precise way, by a local machine base real time calculation of time slices, even in cases where no destination is defined, as long as a departure point can be manually set or automatically detected by a device such a GPS receiver.

According to the above examples, wherein the time slices for road links are assigned based on road edge information between meshes or mesh groups and, optionally, other additional information such as the existence of highway exits within a mesh or the meshes of a mesh group, the processing power needed for the calculation as well as the pre-calculated and/or the stored data amounts required for the calculations are significantly reduced.

According to the above examples, it is possible to estimate the time needed to reach a specific road link within a mesh area by grouping road links and ignoring the individual differences among links within one defined region (mesh or mesh-group) and/or within the same classification. As a result, all the road links within one mesh or within the same classification within one mesh will carry the same offset (or time slice) for route searching or for other applications such as the arrival time estimation.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A method of determining a travel-related time adapted for use in a navigation system, comprising:
   obtaining map information including link information and mesh information, the mesh information dividing an area covered by the map information in a mesh grid having a plurality of meshes;
   obtaining a start position;
   identifying an origin mesh that includes the start position;
   assigning time offsets to each of specific ones of the plurality of meshes based on at least one of a type and a number of links entering each specific one of the meshes; and
   calculating an estimated travel-related time to each of the specific ones of the meshes from the origin mesh based on the assigned time offsets.

2. The method according to claim 1, wherein:
   the mesh grid consists of a plurality of polygons which are adjacent to each other, where the adjacent sides of the polygons define the mesh borders.

3. The method according to claim 2, wherein:
   the polygons are selected from a group including at least one of triangles, rectangles, hexagons, octagons, and squares.

4. The method according to claim 1, wherein:
   the same time offset value is assigned to each of the specific meshes extending in one line on one side of the origin mesh at a same level of distance from the origin mesh; or
   individual time offset values are assigned to each of the specific ones of the meshes.

5. The method according to claim 1, wherein:
   the time offset assigned to each of the specific ones of the meshes include sub-time offset values for different types of links included in the respective specific meshes.

6. The method according to claim 1, wherein:
   assigning the time offsets to the specific ones of the meshes comprises assigning the time offsets based on information indicating a presence of exits from links of specific types.

7. The method according to claim 1, further comprising at least one of:
   generating a time map based on the calculated estimated travel-related times;
   generating a traffic map based on the calculated estimated travel-related times; and
   generating an event map based on the calculated estimated travel-related times.

8. The method according to claim 1, further comprising:
   searching for a route to a destination wherein the estimated travel-related times for the specific ones of the meshes are used to restrict the map information used in the search.

9. The method according to claim 1, further comprising:
   calculating an estimated travel-related time for a particular one of the specific ones of the meshes by adding the time offset of a neighboring specific mesh to the relative time offset of the particular one of the specific ones of the meshes, the neighboring specific mesh being a neighboring mesh in an upstream direction along the flow pattern through the specific meshes beginning at the origin mesh.

10. A non-transitory computer-readable storage medium storing a computer-executable program, the program comprising:
    instructions for obtaining map information including link information and mesh information, the mesh information dividing an area covered by the map information in a mesh grid having a plurality of meshes;
    instructions for obtaining a start position;
    instructions for identifying an origin mesh that includes the start position;
    instructions for assigning time offsets to each of specific ones of the plurality of meshes based on at least one of a type and a number of links entering each specific one of the meshes; and
    instructions for calculating an estimated travel-related time to each of the specific ones of the meshes from the origin mesh based on the assigned time offsets.

11. A navigation system, comprising:
    a memory that stores map information including link information and mesh information, the mesh information dividing an area covered by the map information in a mesh grid having a plurality of meshes; and
    a controller that:
       obtains a start position;
       identifies an origin mesh that includes the start position;
       assigns time offsets to each of specific ones of the plurality of meshes based on at least one of a type and a number of links entering each specific one of the meshes;
       calculates an estimated travel-related time to each of the specific ones of the meshes from the origin mesh based on the assigned time offsets.

12. The system according to claim 11, wherein:
    the mesh grid consists of a plurality of polygons which are adjacent to each other, where the adjacent sides of the polygons define the mesh borders.

13. The system according to claim 12, wherein:
    the polygons are selected from a group including at least-one of triangles, rectangles, hexagons, octagons, and squares.

14. The system according to claim 11, wherein:
    the same time offset value is assigned to each of the specific meshes extending in one line on one side of the origin mesh at a same level of distance from the origin mesh; or
    individual time offset values are assigned to each of the specific ones of the meshes.

15. The system according to claim 11, wherein:
    the time offset assigned to each of the specific ones of the meshes include sub-time offset values for different types of links included in the respective specific meshes.

16. The system according to claim 11, wherein the controller:
    assigns the time offsets based on information indicating a presence of exits from links of specific types.

17. The system according to claim 11, wherein the controller generates at least one of:
    a time map based on the calculated estimated travel-related times;

a traffic map based on the calculated estimated travel-related times; and an event map based on the calculated estimated travel-related times.

18. The system according to claim 11, wherein the controller:

searches for a route to a destination wherein the estimated travel-related times for the specific ones of the meshes are used to restrict the map information used in the search.

19. The system according to claim 11, wherein the controller:

calculates an estimated travel-related time for a particular one of the specific ones of the meshes by adding the time offset of a neighboring specific mesh to the relative time offset of the particular one of the specific ones of the meshes, the neighboring specific mesh being a neighboring mesh in an upstream direction along the flow pattern through the specific meshes beginning at the origin mesh.

20. A navigation system, comprising:

a map drawing module for obtaining map information including link information and mesh information, the mesh information dividing an area covered by the map information in a mesh grid having a plurality of meshes;

a position determining module for obtaining a start position; and identifying an origin mesh that includes the start position; and a time slice calculation module for assigning time offsets to each of specific ones of the plurality of meshes based on at least one of a type and a number of links entering each specific one of the meshes; and calculating an estimated travel-related time to each of the specific ones of the meshes from the origin mesh based on the assigned time offsets.

* * * * *